US007703797B2

(12) United States Patent
Wright

(10) Patent No.: US 7,703,797 B2
(45) Date of Patent: Apr. 27, 2010

(54) MOUNTING BRACKET FOR RAIL MOUNTED AIRBAG INFLATOR

(75) Inventor: Sean Anthony Wright, Livonia, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 593 days.

(21) Appl. No.: 11/555,305

(22) Filed: Nov. 1, 2006

(65) Prior Publication Data

US 2007/0182132 A1    Aug. 9, 2007

Related U.S. Application Data

(60) Provisional application No. 60/765,927, filed on Feb. 7, 2006.

(51) Int. Cl.
*B60R 21/16* (2006.01)

(52) U.S. Cl. .................. 280/728.2; 280/730.2; 280/749

(58) Field of Classification Search ............. 280/728.2, 280/730.1, 730.2, 749; 248/58, 65, 200, 248/205.1, 309.1, 311.2
See application file for complete search history.

(56) References Cited

U.S. PATENT DOCUMENTS

| 5,700,028 | A | 12/1997 | Logan et al. |
| 6,022,044 | A | 2/2000 | Cherry |
| 6,241,278 | B1 * | 6/2001 | Roote et al. ............... 280/730.2 |
| 6,286,858 | B1 | 9/2001 | Shepherd et al. |
| 6,293,581 | B1 * | 9/2001 | Saita et al. ................ 280/730.2 |
| 6,394,486 | B1 | 5/2002 | Fujimura et al. |
| 6,705,636 | B2 * | 3/2004 | Takahara ................... 280/728.2 |
| 6,945,554 | B2 * | 9/2005 | Henderson et al. ........ 280/728.2 |
| 7,172,212 | B2 * | 2/2007 | Aoki et al. ................ 280/730.2 |
| 7,481,448 | B2 * | 1/2009 | Heigl et al. ............... 280/730.2 |
| 2003/0230878 | A1 * | 12/2003 | Inoue ....................... 280/730.2 |
| 2005/0067814 | A1 * | 3/2005 | Hayashi et al. ........... 280/728.2 |

* cited by examiner

*Primary Examiner*—Eric Culbreth
(74) *Attorney, Agent, or Firm*—Gifford, Krass, Sprinkle, Anderson & Citkowski, P.C.

(57) ABSTRACT

An energy absorbing mounting bracket for a rail mounted airbag inflator is provided. The mounting bracket has a circular section and at least one base leg. The circular section entraps an airbag inflator and the base leg is rigidly attached to the circular section and mounted to a vehicle rail. The base leg positions the circular section of the mounting bracket a specific distance from the rail, for the purpose of allowing the section to deflect in a direction towards the rail when an impact force is exerted on the section. One embodiment of the present invention is comprised of a circular section entrapping an airbag inflator and a first base leg, a second base leg and an intermediate leg. The first base leg is located adjacent to the vehicle rail when the bracket is mounted to the rail and is rigidly attached to the intermediate leg. The intermediate leg is rigidly attached to the circular section and the second base leg is also rigidly attached to said section. The first base leg in combination with the intermediate leg and the second base leg position the circular section a specific distance from the rail. The distance from the rail coupled with the design of the base legs and the intermediate leg allow for the circular section to deflect in a direction towards the rail when it experiences an impact force. In this manner, an energy absorbing mounting bracket for a rail mounted airbag inflator is provided.

6 Claims, 5 Drawing Sheets

MOUNTING BRACKET FOR RAIL MOUNTED AIRBAG INFLATOR

RELATED APPLICATION

This application claims priority of U.S. Provisional Patent Application Ser. No. 60/765,927 filed Feb. 7, 2006, which is incorporated herein by reference.

FIELD OF THE INVENTION

The present invention relates to a mounting bracket, and in particular to a mounting bracket for a rail mounted airbag inflator.

BACKGROUND OF THE INVENTION

Many modern automotive vehicles include side airbags which, upon inflation, protect the vehicle occupants from injury during a side impact or rollover. Many of these airbags are mounted on a rail above the window. An inflator is connected with each of the side airbags in order to inflate the airbag when needed. The inflator typically is comprised of a metal cylinder containing compressed gas and is also mounted to a rail above the window. An outlet at one end of the inflator is then fluidly connected through appropriate valving means to the airbag.

With reference to FIG. 1, a typical location of a side impact airbag is shown by the section 4-4. FIG. 2 shows a typical inflator 2 having an outlet conduit 4. The outlet conduit, in turn, typically includes one or more ports 6 which are fluidly connected to the airbag (not shown). Upon actuation of the inflator 2, the rapid flow of a compressed gas from the inflator 2 imposes a rotational torque on the inflator as illustrated by arrow 8. For that reason, it is necessary to rigidly secure the inflator to the automotive rail 9 to prevent rotational movement of the inflator 2 upon actuation.

The inflator 2 is typically concealed from sight by a garnish on the interior of the automotive passenger compartment. Such garnishes are constructed of a flexible material so that, in the event of an impact of a passenger's head or other body member against the garnish during an accident, the garnish will collapse outwardly and thus towards the inflator 2.

Governmental regulations dictate that the garnish within the automotive vehicle provide a specified amount of cushion with respect to an impact from a passenger's head. However, with previously known structures, the amount of space between the garnish and the inflator 2 is relatively small. Consequently, in the event of an impact on the garnish, for example by the head of a passenger during a vehicular accident, the collapse of the garnish is stopped by the inflator 2. This results in a high impact force and thus inadequate protection for the vehicle occupant. Therefore, a mounting bracket for an airbag inflator that can absorb energy from an impact is desired.

SUMMARY OF THE PRESENT INVENTION

An energy absorbing mounting bracket for a rail mounted airbag inflator is provided. The mounting bracket has a circular section and at least one base leg. The circular section entraps an airbag inflator and the base leg is rigidly attached to the circular section and mounted to a vehicle rail. The base leg positions the circular section of the mounting bracket a specific distance from the rail, for the purpose of allowing the section to deflect in a direction towards the rail when an impact force is exerted on the section.

One embodiment of the present invention is comprised of a circular section entrapping an airbag inflator and a first base leg, a second base leg and an intermediate leg. The first base leg is located adjacent to the vehicle rail when the bracket is mounted to the rail and is rigidly attached to the intermediate leg. The intermediate leg is rigidly attached to the circular section. The second base leg is also rigidly attached to said circular section. The first base leg in combination with the intermediate leg and the second base leg position the circular section a specific distance from the rail. The distance from the rail coupled with the design of the base legs and the intermediate leg allow for the circular section to deflect in a direction towards the rail when it experiences a side impact force. In this manner, an energy absorbing mounting bracket for a rail mounted airbag inflator is provided.

DETAILED DESCRIPTION OF THE PRESENT INVENTION

Figure 1:
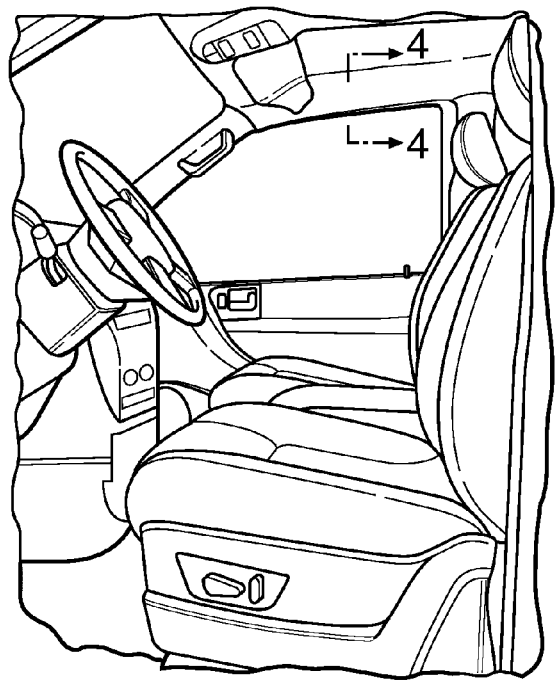
FIG. 1 is a perspective view of the interior of a motor vehicle showing a typical location of a side impact airbag.
Figure 2:
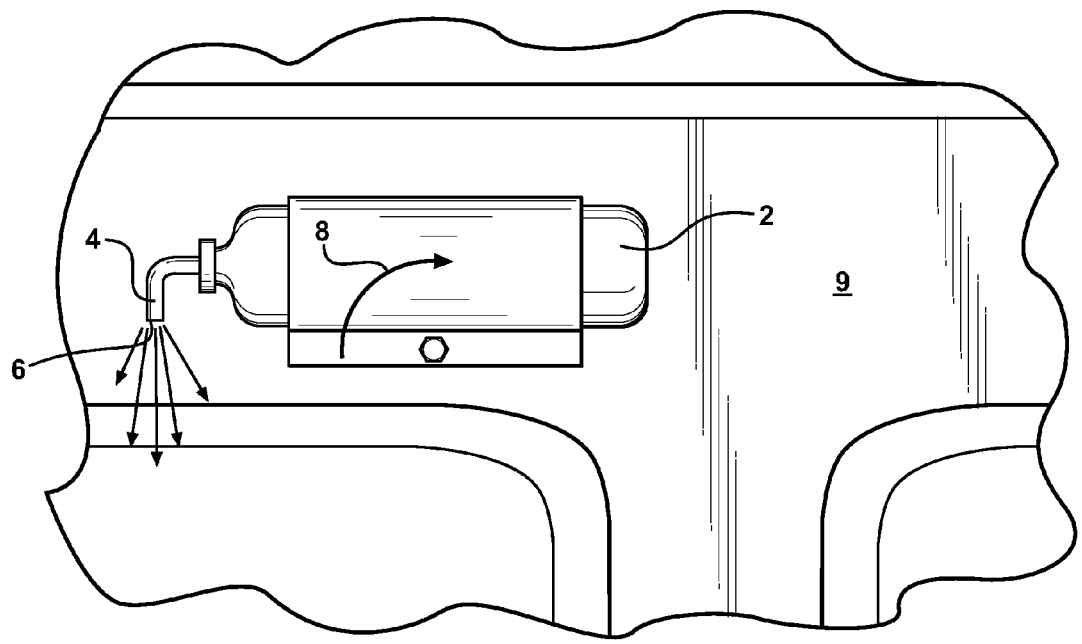
FIG. 2 is a perspective view of an airbag inflator releasing gas through an exit nozzle and subjecting the airbag to a rotational torque.
Figure 3:
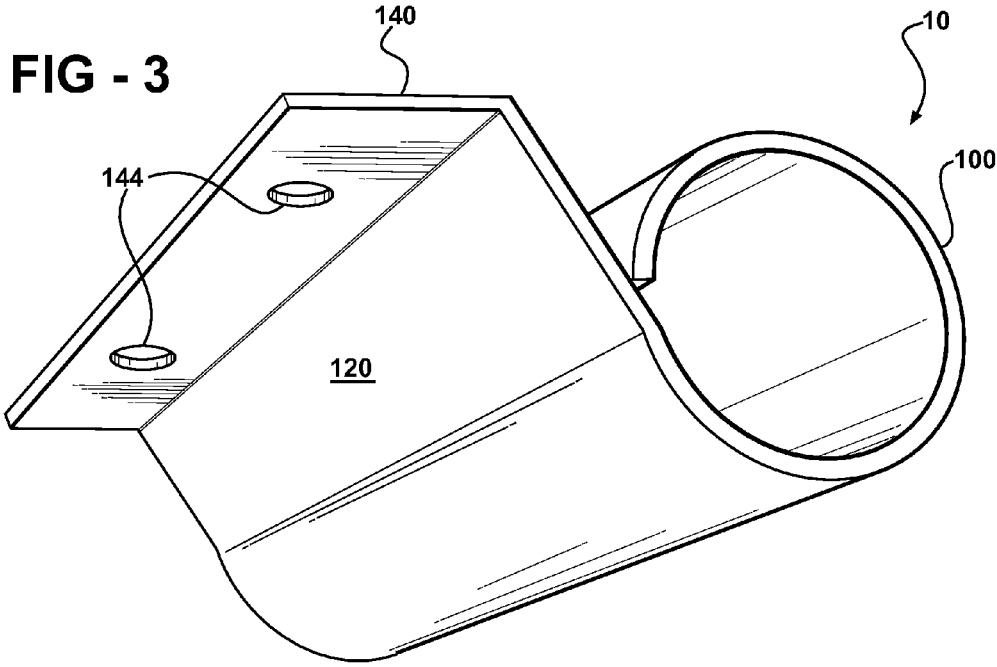
FIG. 3 is a perspective view of a first embodiment of the present invention.

The present invention employs a circular section and at least one base leg to provide an energy absorbing mounting bracket for a rail mounted airbag inflator. Referring to FIG. 3, a first embodiment of the present invention is shown generally at 10. The mounting bracket 10 is comprised of a circular section 100, an intermediate leg 120 and a base leg 140. The circular section 100 is of sufficient length and diameter to securely hold a gas bag inflator (not shown) and can also be referred to as a circular member or cylindrical member. Although not shown in the figure, circular section 100 may include a reinforcement rib.

Base leg 140 is rigidly attached to intermediate leg 120 which is in turn rigidly attached to circular section 100. Base leg 140 can include a strengthening channel and a positioning member attached thereon (not shown). The strengthening channel affords for added strength to the base leg 140 and yet allows for deformation of the bracket 10 when impacted by a sufficient side force. The positioning member aids in the placement of the bracket 10 on the vehicle rail by insertion of said member into a rail aperture. Apertures 144 can be included within base leg 140 and provide for the bolting of mounting bracket 10 to a motor vehicle frame.

Figure 4:
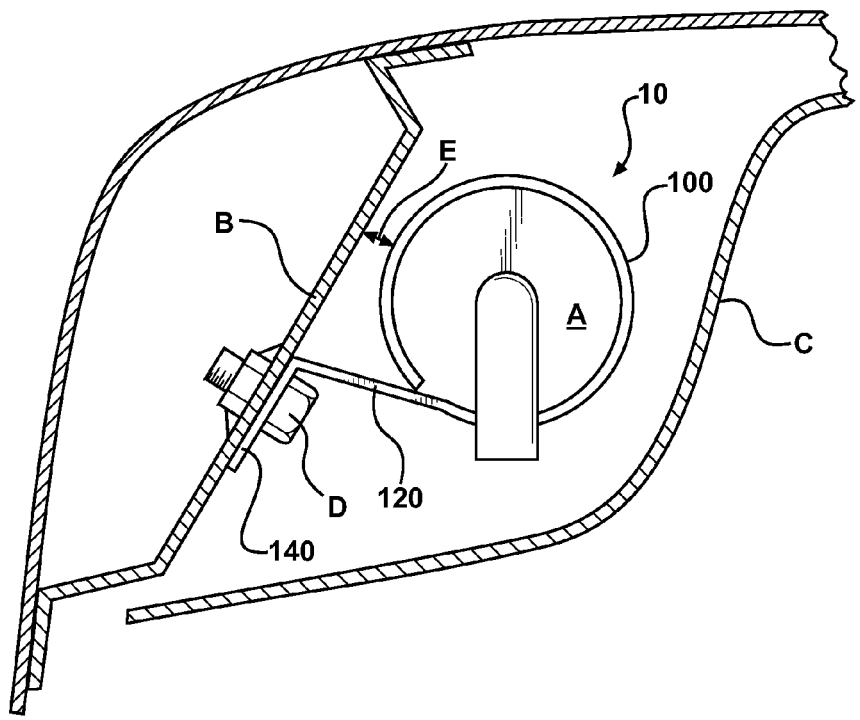
FIG. 4 is a side view of the first embodiment as mounted to a motor vehicle rail.
Figure 5:
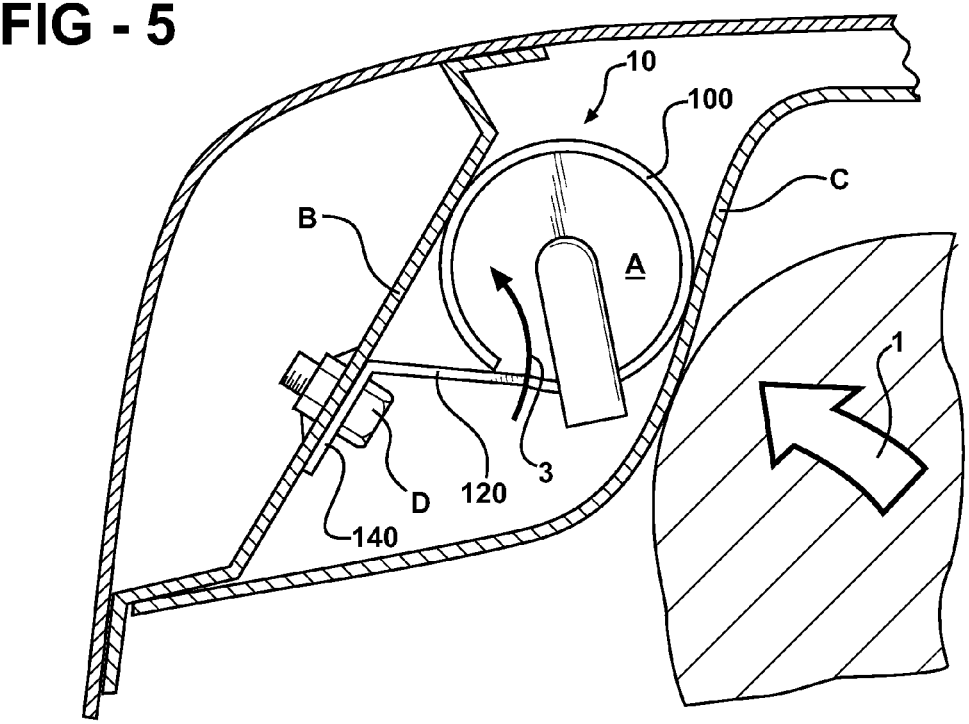
FIG. 5 is a side view of the first embodiment after experiencing a side impact force.

Turning now to FIGS. 4 and 5, the mounting bracket shown in FIG. 3 securely holds an airbag inflator A and is bolted to a vehicle rail B. The mounting bracket 10 with inflator A is typically hidden from sight using garnish C and secured to the vehicle rail B using bolt D.

As shown in FIG. 5, upon experiencing a side impact force 1 the mounting bracket 10 with inflator A contained therein deflects in a direction 3 towards the vehicle rail B. In this manner, the mounting bracket 10 affords for absorption of energy when an object from within the vehicle impacts said bracket from a side direction.

Figure 6:
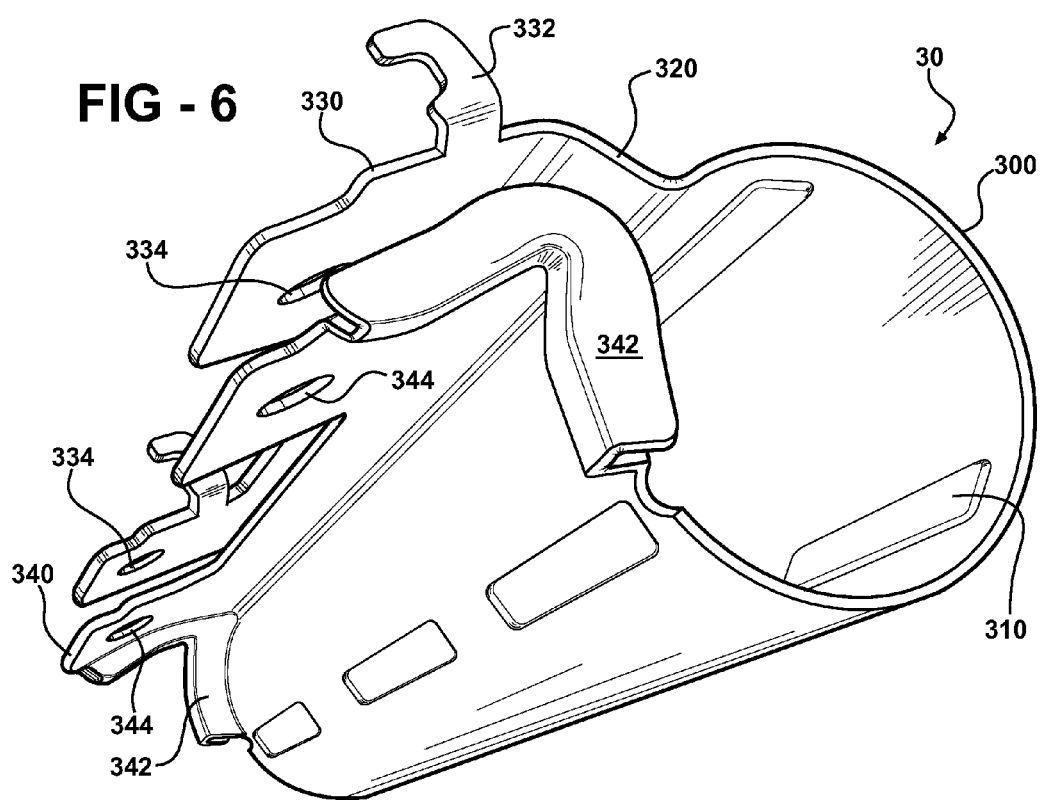
FIG. 6 is a perspective view of a second embodiment of the present invention.

Turning now to FIG. 6, a second embodiment of the present invention is shown generally at 30. The mounting bracket 30 is comprised of a circular section 300, an intermediate leg 320, a first base leg 330 and a second base leg 340. The circular section 300 is comprised of a cylindrical sleeve of material with at least one reinforcing rib 310 therein. In the alternative, circular section 300 does not contain reinforcing ribs 310. For illustrative purposes only, FIG. 6 shows reinforcing ribs 310 oriented in a longitudinal direction along circular section 300. In the alternative, reinforcing ribs 310 can be oriented in a radial direction or a combination of longitudinal and radial directions with respect to circular section 300.

Intermediate leg 320 is rigidly attached to circular section 300 and to first base leg 330. The first base leg 330 is comprised of a sheet material which is adjacent to vehicle rail B when bracket 30 is mounted to said rail. The first base leg 330 can also include apertures 334 and positioning members 332. The positioning member 332 in the present embodiment is afforded by an L-shaped hook which aids in positioning the mounting bracket 10 on a motor vehicle rail by placing said member 332 within a rail aperture (not shown).

The second base leg 340 is rigidly attached to circular section 300 and can include apertures 344 and strengthening channel 342. Strengthening channel 342 affords for added strength to the second base leg 340 and can be rigidly attached to at least part of circular section 300. In addition, it is appreciated that FIG. 6 teaches strengthening channel 342 can be generally U-shaped, is located at an end of the circular section 300, extends transversely to a longitudinal axis (not shown) of the circular section 300, and is integral with the circular section 300 and second base leg 340. The positioning member 332, apertures 334 and apertures 344 afford for the positioning and mounting of bracket 330 to a motor vehicle frame.

Figure 7:
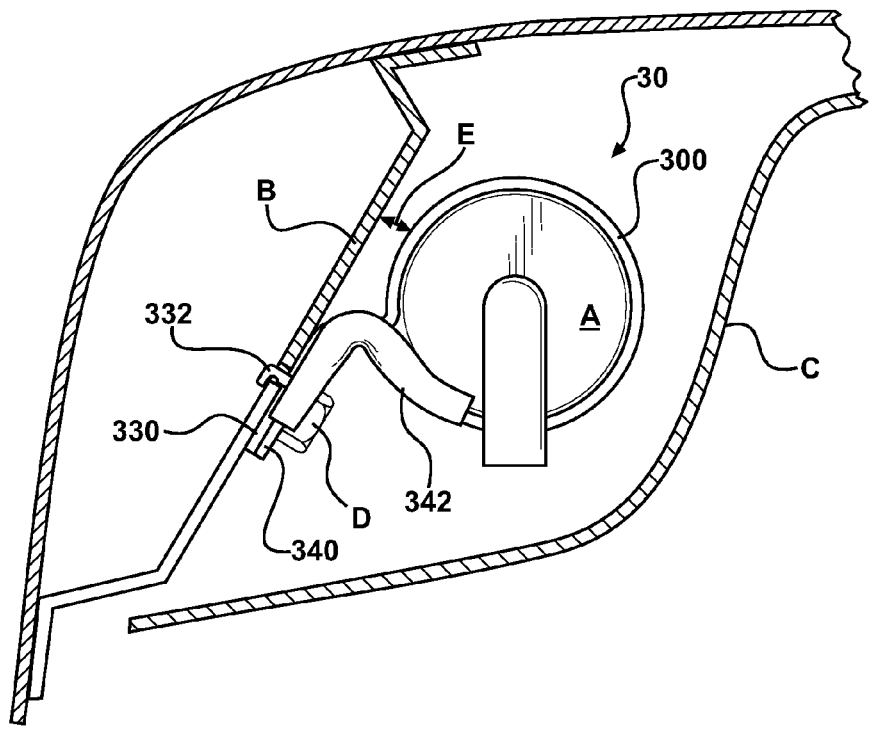
FIG. 7 is a side view of the second embodiment of the present invention as mounted to a vehicle rail.
Figure 8:
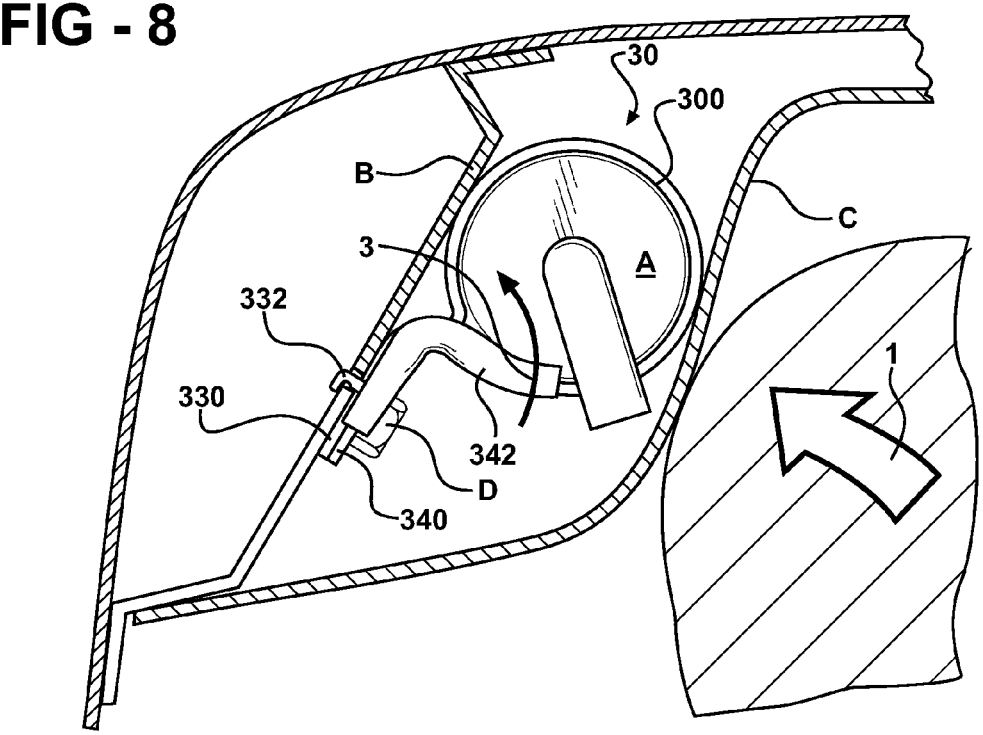
FIG. 8 is the second embodiment of the present invention after experiencing a side impact force.

Turning now to FIGS. 7 and 8, a side view of the mounting bracket 30 is shown. In FIG. 7, the bracket 30 is bolted to a motor vehicle rail B using a bolt D which passes through apertures 344 and 334. The mounting bracket 30 securely holds an inflator A therein. The bracket 30 and inflator A are typically hidden from sight from within the motor vehicle by garnish C. Once bracket 30 is attached to vehicle rail B, circular section 300 with inflator A held therein is rigidly located at a distance E from the rail B. Preferably, the distance E from the rail B at which circular section 300 with inflator A is located, is in the range of 2 millimeters (mm) to 100 mm. More preferably, the range is between 5 mm and 50 mm. Even more preferably, the range is between 5 mm and 15 mm.

FIG. 8 illustrates the mounting bracket 30 after impact by a side force 1. As shown in this figure, the inventive bracket of the present invention affords for the movement of the circular section 300 with inflator A contained therein in a direction 3 towards vehicle rail B. In this manner, the bracket 30 can absorb energy when impacted by a side impact force 1.

Figure 9:
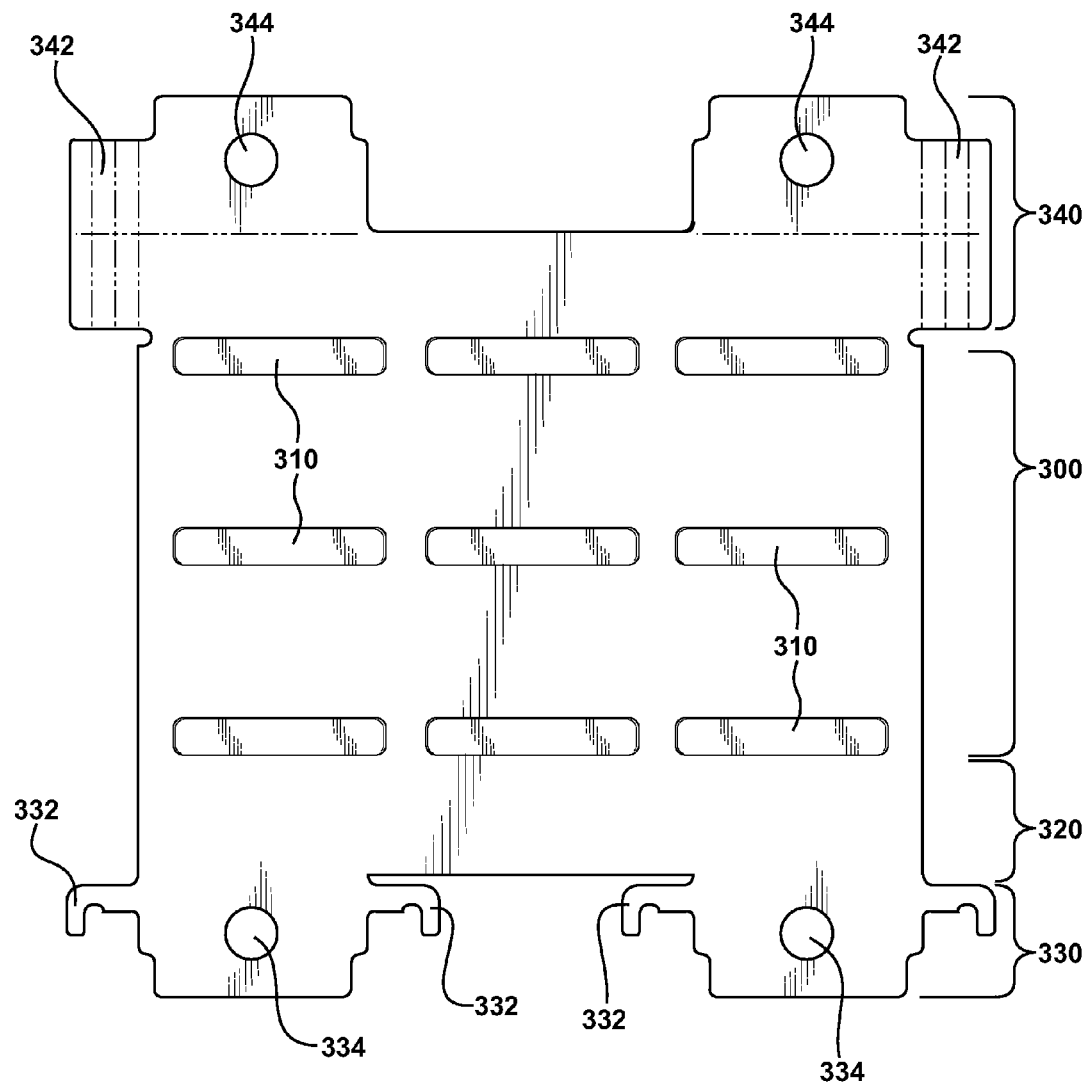
FIG. 9 is a top view of a sheet material used to form the present invention.

It is preferable to manufacture the inventive mounting bracket of the present invention from a single piece of sheet material. FIG. 9 provides a top view of a single sheet of material used to manufacture bracket 30 after the apertures, positioning members, reinforcement ribs and strengthening channels have been laid out and cut from a larger piece of sheet material, but before the bracket has been formed. As noted earlier, the reinforcement ribs 310 are not required. In addition, the apertures, positioning members and strengthening channels are not required in order for the present invention to afford an energy absorbing mounting bracket for a gas inflator. The mounting bracket 10 and/or mounting bracket 30 are manufactured from any material known to those skilled in the art, illustratively including metals, alloys, fiberglass and plastics.

From the foregoing, it can be seen that the present invention provides a simple and yet effective energy absorbing mounting bracket for a gas bag inflator. Having described the invention, however, many modifications thereto will become apparent to those skilled in the art to which it pertains without deviation from the spirit of the invention as defined by the scope of the appended claims.

The invention claimed is:

1. An energy absorbing mounting bracket for mounting a rail mounted airbag inflator on a vehicle rail, said mounting bracket comprising:
    a cylindrical member, said cylindrical member directly contacting and entrapping an airbag inflator;
    a base leg rigidly attached to said cylindrical member and mountable to a vehicle rail, said base leg positioning said cylindrical member a distance from the rail, for the purpose of allowing said cylindrical member to deflect in a direction towards the rail when an impact force is exerted on said cylindrical member; and
    a generally U-shaped strengthening member extending outwardly from an end of said cylindrical member and extending transversely to a longitudinal axis of said cylindrical member, said U-shaped strengthening member, said base leg and said cylindrical member formed from a single member;
    wherein said generally U-shaped strengthening channel adds strength to said base leg.

2. The invention of claim 1, wherein said base leg includes an aperture, for the purpose of bolting said base leg to the rail.

3. The invention of claim 1, wherein said base leg includes a positioning member, for the purpose of positioning the mounting bracket on the vehicle rail.

4. The invention of claim 3, wherein said positioning member includes an L-shaped hook.

5. The invention of claim 1, wherein said cylindrical member has a reinforcing rib extending in a longitudinal direction along said cylindrical member.

6. The invention of claim 5, wherein said reinforcing rib is integral with said cylindrical member.

* * * * *